US012582948B2

(12) United States Patent
    Dunigan

(10) Patent No.:  US 12,582,948 B2
(45) Date of Patent:    Mar. 24, 2026

(54) SUBMERSIBLE SYSTEM FOR PRODUCTION OF A STABILIZED GAS FLUX

(71) Applicant: INFUSION TECHNOLOGY, INC., Baton Rouge, LA (US)

(72) Inventor: Michael Dunigan, Fairhope, AL (US)

(73) Assignee: INFUSION TECHNOLOGY, INC., Baton Rouge, LA (US)

( * ) Notice: Subject to any disclaimer, the term of this patent is extended or adjusted under 35 U.S.C. 154(b) by 1020 days.

(21) Appl. No.: 17/530,044

(22) Filed: Nov. 18, 2021

(65) Prior Publication Data

US 2023/0149863 A1    May 18, 2023

(51) Int. Cl.
    *B01F 23/232*     (2022.01)
    *B01F 23/237*     (2022.01)
    *B01F 23/2373*    (2022.01)
    *B01F 23/70*      (2022.01)
    *B01F 25/31*      (2022.01)
    *B01F 25/433*     (2022.01)
    *C02F 1/74*       (2023.01)
    *B01F 101/00*     (2022.01)
    *E03B 7/07*       (2006.01)

(52) U.S. Cl.
    CPC ........ *B01F 25/4331* (2022.01); *B01F 23/232* (2022.01); *B01F 23/2373* (2022.01); *B01F 23/237611* (2022.01); *B01F 23/708* (2022.01); *B01F 25/31* (2022.01); *C02F 1/74* (2013.01); *B01F 2101/305* (2022.01); *C02F 2301/026* (2013.01); *C02F 2303/26* (2013.01); *E03B 7/074* (2013.01)

(58) Field of Classification Search
    None
    See application file for complete search history.

(56) References Cited

U.S. PATENT DOCUMENTS

| | | | | |
|---|---|---|---|---|
| 3,704,008 A | * | 11/1972 | Ziegler | B01F 25/312 |
| | | | | 261/78.2 |
| 4,221,336 A | * | 9/1980 | Diamond | A61H 33/027 |
| | | | | 285/271 |
| 5,514,267 A | * | 5/1996 | Machiya | C02F 1/24 |
| | | | | 261/36.1 |
| 2005/0051577 A1 | * | 3/2005 | Loeb | B05B 7/30 |
| | | | | 222/145.6 |
| 2014/0339715 A1 | * | 11/2014 | Collins | B01F 23/232 |
| | | | | 261/23.1 |

FOREIGN PATENT DOCUMENTS

| | | | | | |
|---|---|---|---|---|---|
| JP | 3122320 B2 | * | 1/2001 | | |
| WO | WO-2022009035 A1 | * | 1/2022 | | B01F 23/2373 |

OTHER PUBLICATIONS

Machine translation of JP-3122320-B2, pp. 1-8. (Year: 2001).*

* cited by examiner

*Primary Examiner* — Clare M Perrin
(74) *Attorney, Agent, or Firm* — Kean Miller LLP; Russel O. Primeaux; Lauren J. Rucinski

(57)                ABSTRACT

A diffusion system comprising an upper unit and a lower unit. The upper unit comprises a series of tubing that is situated so as to effectuate collision of the fluid and air molecules. The upper unit uses vortex winding and unwinding and pressure gradients to avoid gas and liquid separation to accomplish successful collisions between a gas and a liquid. The lower unit comprises a filtering system, liquid intake system, air intake system, and submersible liquid transportation system.

4 Claims, 10 Drawing Sheets

101

201

707

708

709

710

711

714c

714b

714a

SUBMERSIBLE SYSTEM FOR PRODUCTION OF A STABILIZED GAS FLUX

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

SUMMARY OF THE INVENTION

The present invention relates to an apparatus and method for injecting and pre-dissolving gases into a liquid to produce high concentrations of microscopic (non-rising) gas bubbles in the invention's liquid exit stream.

DESCRIPTION OF THE DRAWINGS

The drawings constitute a part of this specification and include exemplary embodiments of the Submersible System for Production of a Stabilized Flux, which may be embodied in various forms. It is to be understood that in some instances, various aspects of the invention may be shown exaggerated or enlarged to facilitate an understanding of the invention. Therefore, the drawings may not be to scale.

BACKGROUND

Figure 1:
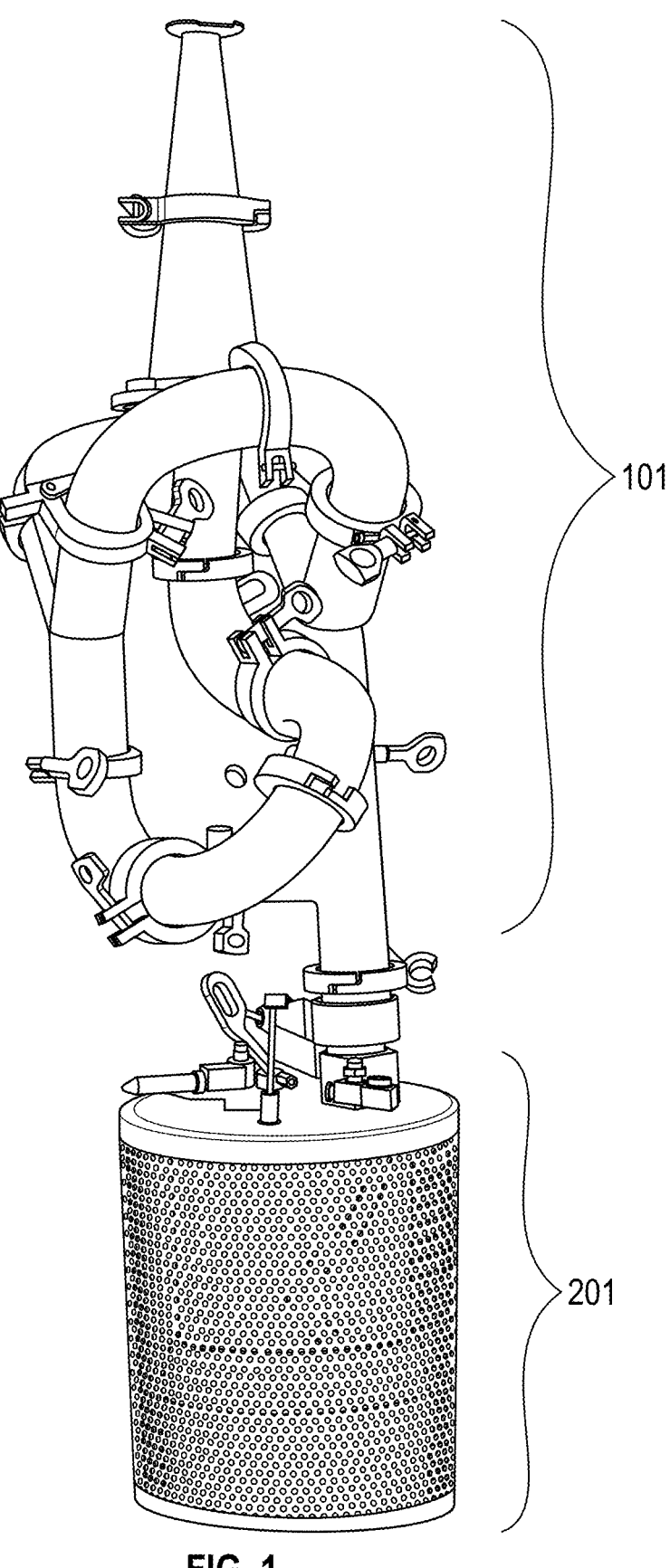
FIG. 1 is an embodiment of the submersible diffusion system for stable flow.

Municipal and industrial water dischargers are regulated by state or federal environmental agencies to ensure the biological oxygen demand ("BOD") has been reduced to an appropriate level before discharge. Achieving the proper BOD levels ensures that there is no deleterious effect to the dissolved oxygen content of the receiving body of water.

These water bodies have relied on aeration systems to maintain ecological health for decades. An evolution in technology has introduced gas dissolution systems to increase the effectiveness and the efficiency in treatment. In addition to lowering the BOD, gas dissolution has become an important tool in treating water in a host of other applications, such as eliminating algal blooms, controlling odors, and reducing nutrient levels. These effects are well known.

The principal of operation of diffusion techniques comprises the introduction of a gas under pressure into a liquid carrier to effectively dissolve the gas. An effective system will discharge a highly concentrated stream of microscopically sized gas bubbles in the exiting liquid (or "flux").

Prior art gas dissolution systems rely almost exclusively on increasing the partial pressure applied above the gas to water interface to dissolve the oxygen gas into the desired fluid. That is, the systems use the general physical phenomena that the amount of a gas dissolved by a liquid is proportional to the pressure of the gas upon the liquid (referred to herein as "Henry's Law"). This rule holds for dilute solutions with low gas pressure.

One example of prior art is a floating aeration system consisting of a water pump which forces water into the ambient air so that some air molecules are incorporated into the water before the fluid is returned back to the desired body of water. These types of systems are often used in stagnant semi-stagnant water bodies, such as a pond to decrease algae growth. Since no additional partial pressure was exerted in this technology, the gas bubbles formed will be too big in size, and therefore, buoyant to remain entrained in the water body. They will quickly rise to the surface and dissipate.

In other prior art systems, compressed or pressurized gases are pumped through a fine bubble diffuser positioned on the bottom of the pond. The bubbles created by these systems suffer from the same buoyancy issues described above. Pressure was applied to the gas, but the gas was not effectively mixed with the liquid carrier before its discharge into the water body. These bubbles will also be too big in size to stay in solution. They will also rise quickly and dissipate. Thus, the oxygen is not effectively entrained in the treated water body.

One example of a prior art gas dissolution system blends a steady flow of pressurized gas into a high flow and highly pressure liquid carrier to produce the desired microscopic bubble sizes. These pressurized systems are not submersible; instead, they rely on a large external liquid pump to force the liquid flow across a gas diffuser. The force of the water across the diffuser membrane pulls the oxygen gas feed into solution, before being discharged back into the water body.

Other prior art systems rely on large external liquid pumps to bring the liquid carrier into the top of a high-pressure tank where highly pressurized gases are also introduced. The mixing or blending of the pressurized (oxygen) gas with the pressurized liquid produces the desired effect of smaller bubbles entrained within the fluid. Moreover, the gases and liquids are transported as separated components, to a dedicated reaction zone for contact and then discharged. Because of this separation of travel, no gas dissolution occurs during their individual long runs of pipe prior to the reaction zone. Because of this, the reaction times (in the tank) become a limiting factor, with the average contact opportunity time being limited to less than one minute before discharge. The discharge product exits the tank and immediately losses the applied pressure it was subjected to in the tank. Any bubbles that are larger than a microscopic size will begin to separate immediately. This is not ideal because it lowers the gas concentration in the exiting product. Like the previous art, these pressurized systems are not submersible.

Some prior art systems use in-line static mixers in an attempt to achieve the successful collisions under pressure to reach microscopic size and to address the shortcomings of the prior art discussed above. However, the static mixers are incapable of applying enough turbulent pressure to achieve the microscopic size. Shortly after the mixer location, the bubbles will grow large and float to the top of the pipe ("crowning effect") reducing the effectiveness of the exiting product. Although these mixers achieve the mixing of gas and liquid, they lack the applied pressure necessary to entrain the gas bubbles over a longer duration and to maintain a microscopic scale of the bubbles. Thus, inline static mixers suffer from increased head loss across the system. This causes more strain on the water pumps, which shortens the operational life and increases the system's energy consumption.

Thus, a system is needed that produces a consistent liquid product containing entrained, highly concentrated, microscopically sized gas bubbles for diffusion into a water body in need of treatment. This inventive system and method provides a diffusion system comprising an upper unit and a lower unit. The upper unit comprises a series of tubing that is situated so as to effectuate collision of the fluid and air molecules. The upper unit uses vortex winding and unwinding to avoid gas and liquid separation to quickly accomplish successful collisions between a gas and a liquid. Additionally, the upper unit configuration uses pressure drops and pressure gradient changes, in order to achieve successful collisions. The lower unit comprises a filtering system, liquid intake system, air intake system, and submersible liquid transportation system. The discharge system imparts a strong vortex which acts as a force multiplier for pond/tank mixing, which serves as a "free and effective" catalyst for biological and chemical reactions.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

This inventive system and method provide a collision chamber which induces vortex flow and forces collisions between air and water molecules. The resulting flow exiting the system comprises entrained bubbles that are nanoscopic or microscopic in size. This scale of the bubbles produces and suspended within the fluid is defined herein as a stabilized "flux." The bubbles remain entrained, suspended, and dispersed through the flux as the stream is introduced into the waterbody. The bubbles in the flux also tend to be negatively charged, which aids in conglomeration and settling of suspended particles which are positively charged within the waterbody.

The system comprises an upper unit 101 and a lower unit 201. The upper unit comprises a series of tubing 701 that is situated so as to effectuate collisions between the fluid and the gas molecules. The upper unit (sometimes referred to herein as the liquid/gas collision chamber, or "LGCC") 701 uses vortex spins which are wound and unwound through the shape of the pipe to accomplish successful collisions between a gas and liquid. Additionally, the upper unit 701 configuration uses pressure drops and pressure gradient changes under Henry's Law, to achieve successful collisions between the gas and liquid. As used herein "successful collisions" means that the gas molecules are collided with fluid molecules so that the gas molecules are compressed and form microscopic or nanoscopic (approx. 50 nm to 200 nm) bubbles, which in turn decreases the buoyancy of the resulting bubbles.

Because of the scale of the bubbles, they become negatively charged. This is helpful in waterbody purification applications.

The lower unit comprises a filtering system 301, liquid or water intake system 401, air intake system 501, and submersible pump 601. In one or more embodiments, the system may also comprise an auxiliary air system and compressor, which provides a second stream of either ambient air or other gas (or both) to the system.

Figure 2:
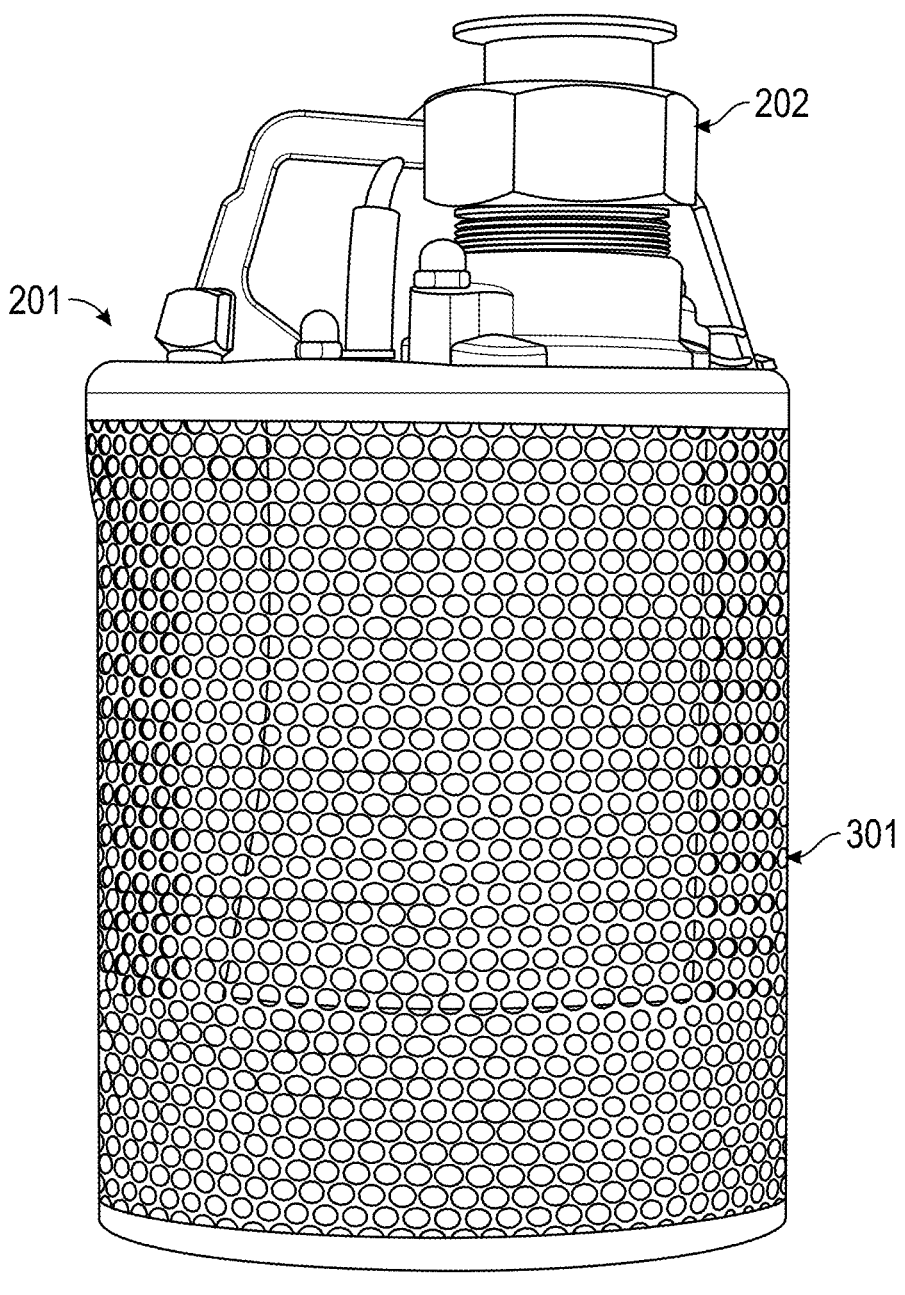
FIG. 2 shows the lower unit.
Figure 3:
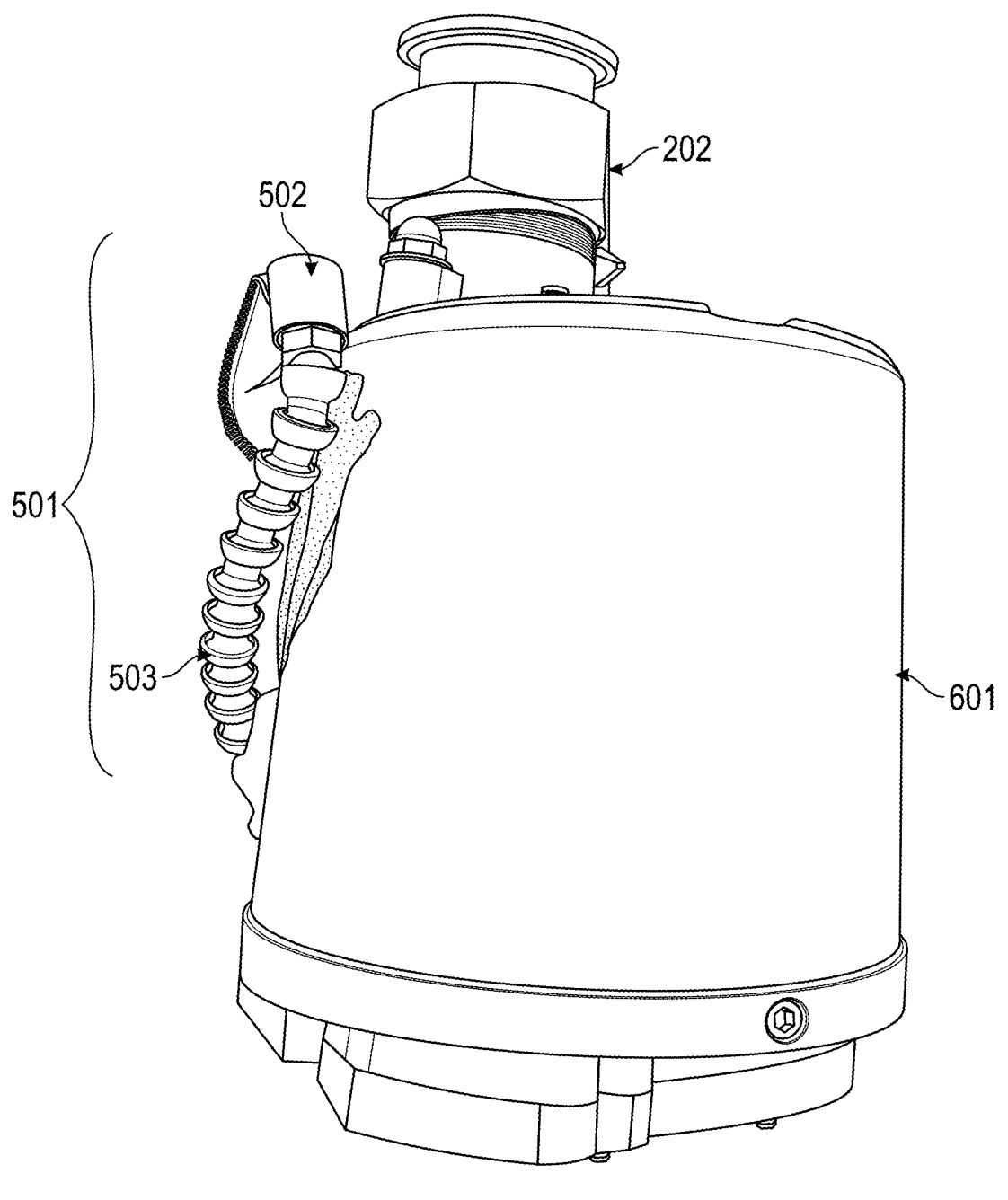
FIG. 3 shows the lower unit without the screening system.

Water is pulled in through the filter system 301 from a water body by the submersible pump 601. In one or more embodiments, the filter system 301 comprises a metal mesh as a screen 302 encircling the lower unit 301 as shown in FIG. 2. The size of the mesh is preferably ¼ inch, however, in other embodiments, the mesh sizing is any size suitable to ensure larger particles do not enter the intake system 401. In a preferred embodiment, the screen 301 is an inch away from the water intake system 401. In other embodiments the filter system 301 may comprise more than an inch.

The submersible pump 601 may be any known in the industry suitable for pulling water from the waterbody and through the system. The pump 601 is cavitation and corrosion resistant through means known in the art, including controlling the RPM to a range up to 3500 rpm, installing an inducer, controlling the temperature of the pump, and through selected materials.

Figure 4:
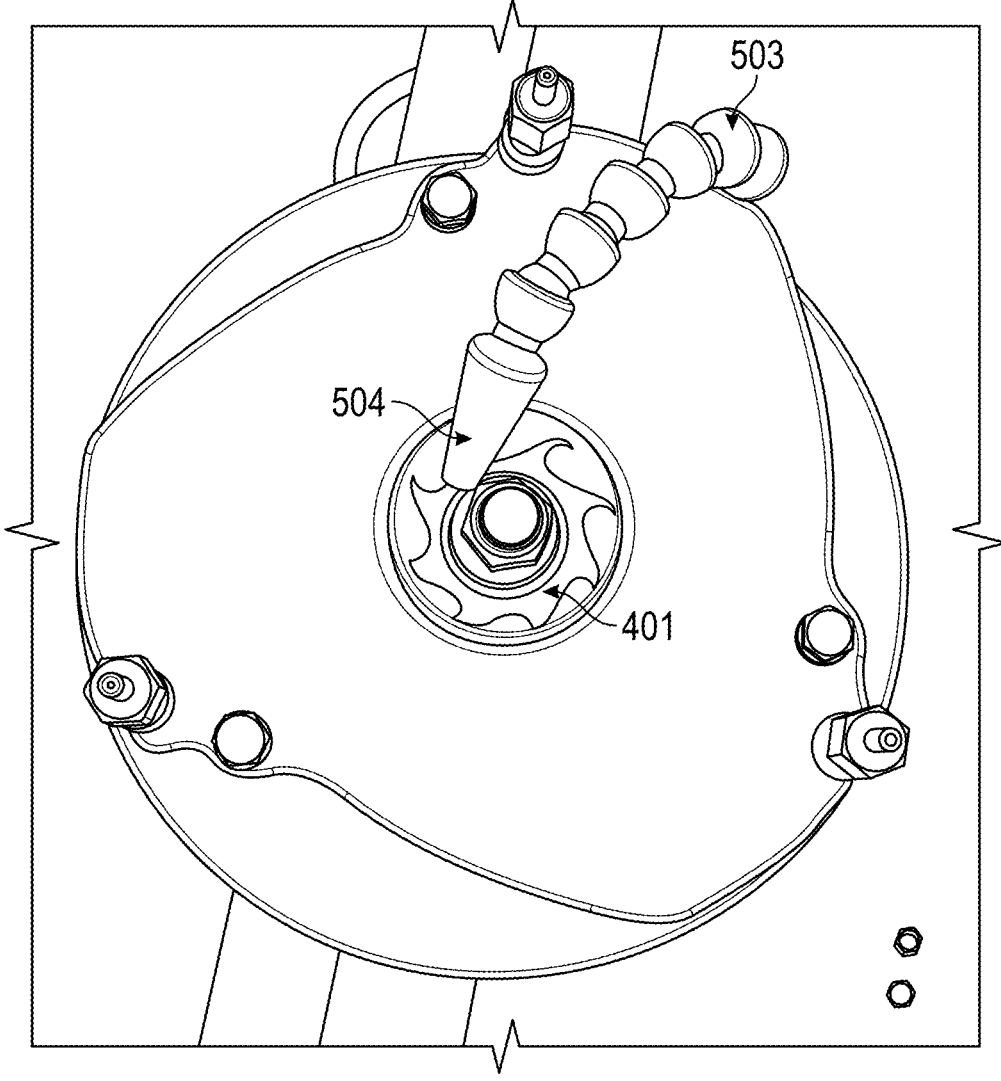
FIG. 4 shows the water intake and ambient air intake systems.

After passing through the filtering system 301, the liquid is pulled into the liquid intake system 401. One embodiments of the liquid intake system 401 is shown in FIG. 4.

Air is injected into the system through the air intake system. The main air intake system 501 comprises an air intake nozzle and attached breather tube 503. The breather tube 503 is open to the ambient air at one end and, when in use, extends beyond the surface of the water to facilitate access to ambient air. The open end of the breather tube 503 may be attached to a float or may be extended to a nearby water shore. There may be a regulator 502 attached to the breather tube 503.

The other end of the breather tube 503 is in fluid connection with the pump 601 and the air intake nozzle 504, so that the ambient air is pulled into the system through the pump along with the fluid. Based on the shape of the intake of the pump 601, a venturi uses the negative pressure generated to draw the air in as a second fluid to the primary flow. In particular, using the kinetic energy of the water flowing through the pump intake, a venturi effect is activated to induce air flow through the pump and to draw the air into the primary fluid, water.

Figure 5:
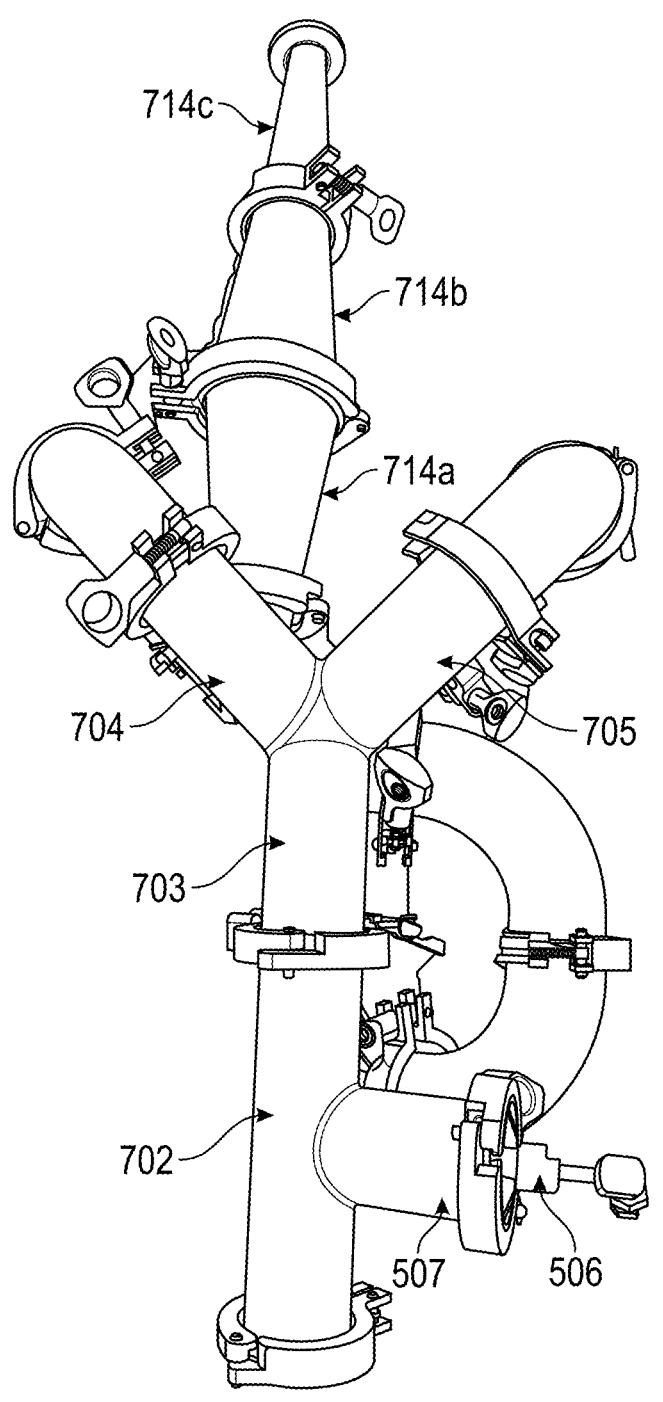
FIG. 5 is an embodiment of the upper unit.
Figure 6:
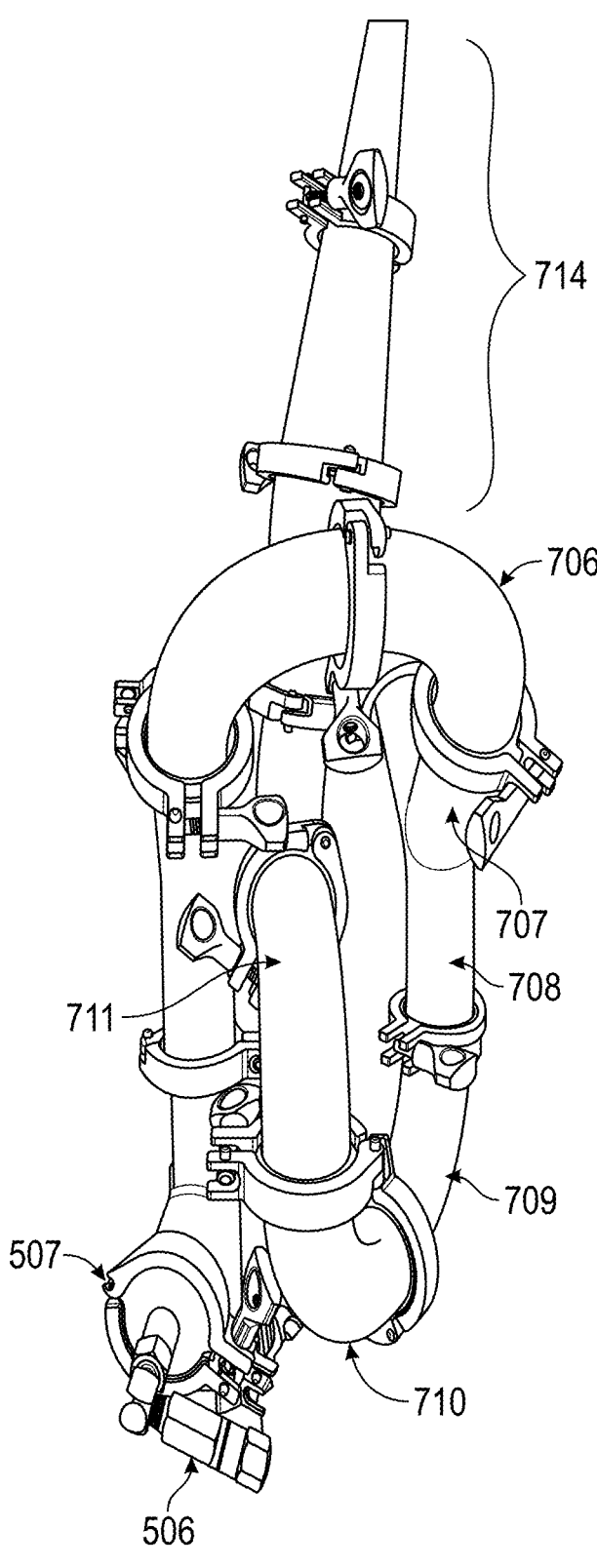
FIG. 6 is view of the upper unit shown in FIG. 5.
Figure 10:
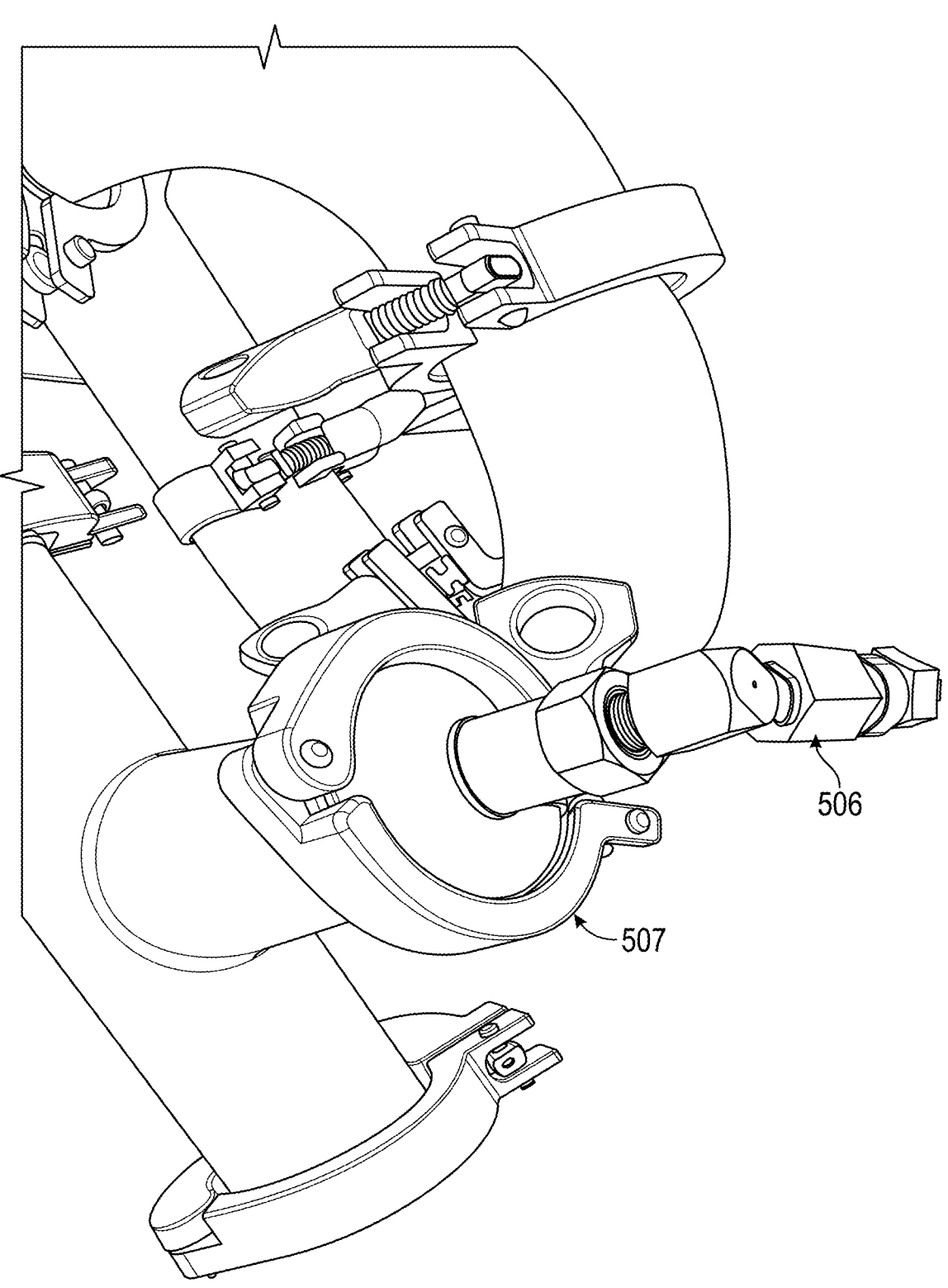
FIG. 10 shows the aux feed (gas or liquid) point and backflow preventor.

In one or more embodiments, the system also includes an auxiliary air induction inlet on the upper unit 506, 507. FIG. 10 shows one embodiment. This auxiliary air induction system also comprises a compressor or pressurized tank. This allows the system to also pull in pressurized air or oxygen to further excite the flow through the LGCC 701. As shown in FIGS. 5 and 6, the auxiliary air induction system connection 506 and back flow preventer 507 are shown. When the auxiliary air induction system is engaged, the ambient air side of the breather tube 503 is constricted, but not closed completely.

Figure 7:
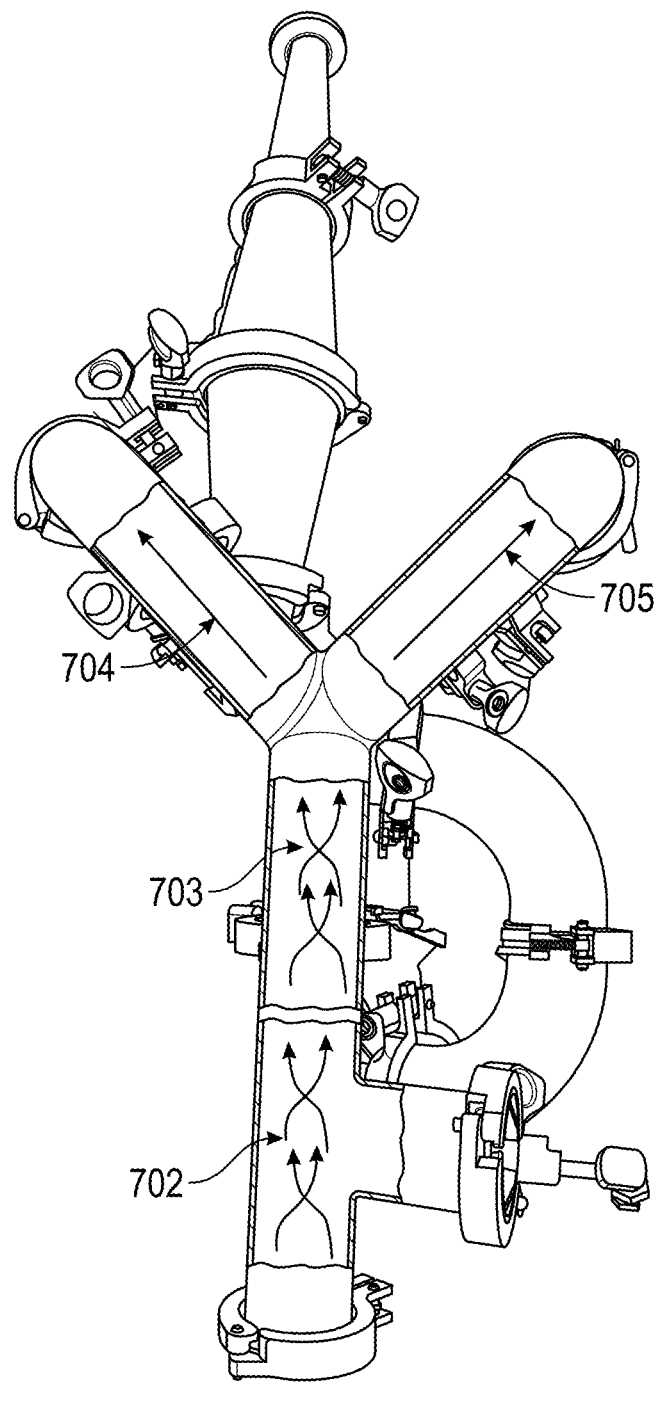
FIG. 7 is a cutaway view of FIG. 5.
Figure 8:
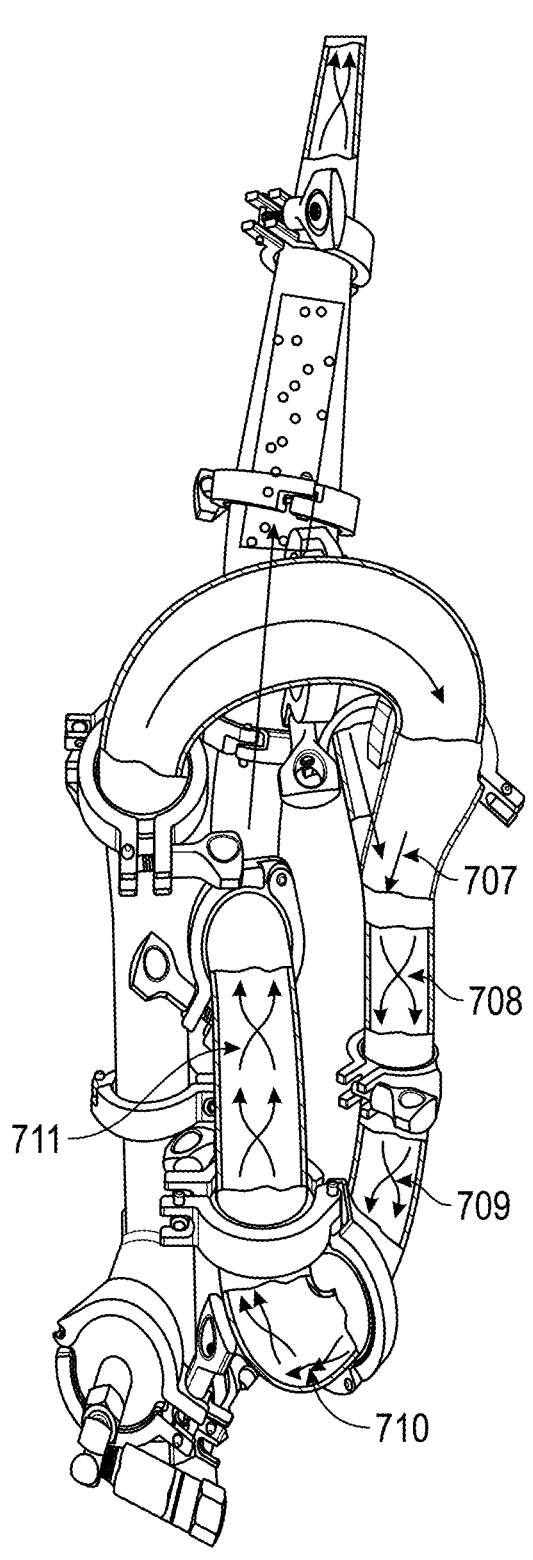
FIG. 8 is a cutaway view of FIG. 6.
Figure 9:
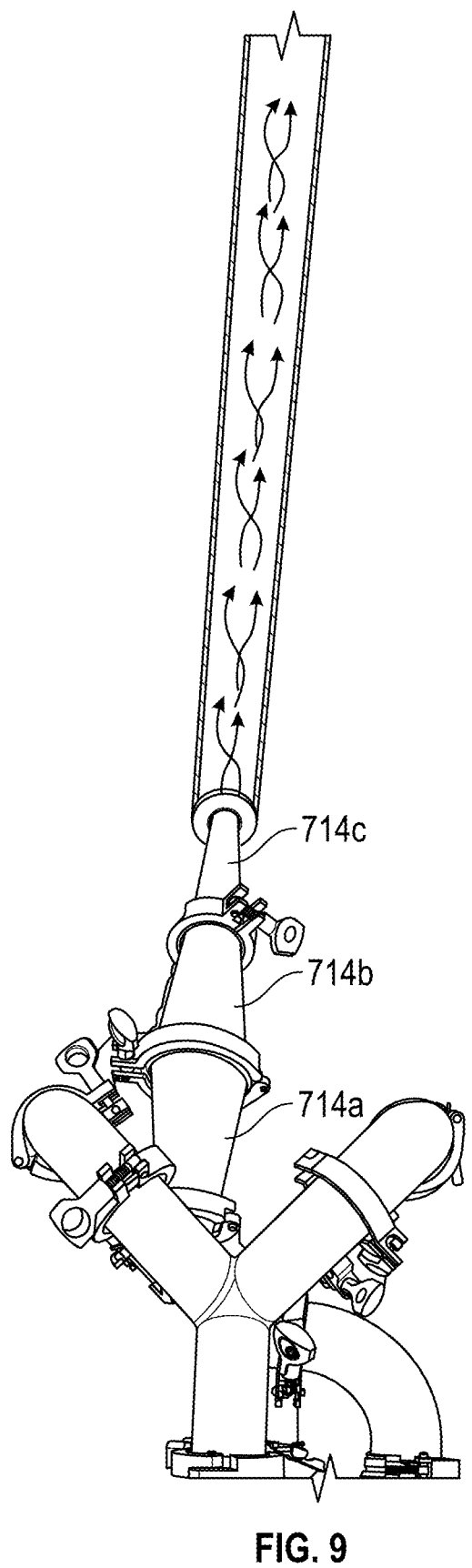
FIG. 9 is an embodiment of the nozzle and exiting flow.

The LGCC 701 and lower unit 201 are connected with a modular connector 202 shown in FIG. 2. The LGCC 701 comprises a series of piping and clamp fittings. The flow direction is shown in FIGS. 7 and 8 as it travels through the LGCC. In a preferred embodiment tri-clamp sanitary pipe and stainless-steel (SS) fittings are used. In one or more embodiments, high pressure 304 SS sections are used; however, any piping suitable to manufacture the flow pattern claimed herein and provide corrosion resistance may be used. In one or more embodiments, silicon gaskets are used to great a water-tight seal.

Successful collision is achieved based on the configuration of the tubing in the LGCC 701. In short, the water and gas enter into the upper unit as vortex flow supplied by the submersible pump 601. The first section of piping comprises a 90-degree elbow or turn, which provides further collision opportunities and assists in maintaining the vortex flow. After the 90-degree elbow, the flow is split at a y-shaped section. Splitting the flow in this manner reduces the velocity of the flow. A decrease in velocity increase the pressure on the flow under Henry's Law and creates further turbulence within the flow. This turbulence results in more successful collisions. After the y-shaped section, the flow is directed through sections that turn the flow approximately 180-degrees, after which the flow is returned to a single stream through an inverted y-section and is then directed through a series of 90-degree turn sections to initiate and continue vortex flow. The flow is then directed through concentric circle piping nozzle, as more fully discussed below.

By directing the flow through the turn sections and y-sections, the vortex is "wound" and "unwound" which leads to more successful collision and ensures that the resulting gas bubbles do not crown at the top of the piping. The flow that results is defined herein as a "flux" and comprises a fluid with integrated microscopic or nanoscopic bubbles that maintain their shape and position within the flow.

In order to more fully describe an embodiment of the LGCC 701 discussed above, FIG. 5 is now described. As depicted in FIGS. 5, as the fluid leaves the pump it enters the intake section 702. The intake section may also contain a "T" intake which can be used for injection of additional gas into the fluid. In one preferred embodiment intake section 702 will be constructed of 2-inch diameter stainless steel sanitary pipe that is approximately 8 inches long.

Upon leaving the intake section 702, the fluid is then split into two separate flow paths by using a first Y section. The first Y section consist of a first Y straight section 703 and two first Y splits 704, 705 that diverge at 45 degrees from the Y straight section 703.

After the first Y split, each path will include two 90-degree sections that create a 180 degree turn 706 as shown in FIG. 6. In a preferred embodiment, the 90-degree sections for each path will be constructed of tubing that is 2 inches in diameter and approximately 5 inches in length around the outside curve of the 90-degree section. This configuration is also known as a "Y connector."

After the fluid has gone through the 90° sections of each path, the divergent fluid paths are converged in a second Y section 707 as shown in FIGS. 7 and 8. After the divergent fluid paths are converged through the Y section 707, the fluid goes into a straight portion of the second Y section 708. In a preferred embodiment, that straight portion is approximately 6 inches in length.

From there the fluid will go through a series of 90-degree street elbow fittings, 709-711. The smooth and flowing street elbows maximize flow dynamics and reduce the pumping horsepower necessary to form a microscopic bubble flow.

After exiting the last 90-degree street elbow, the fluid goes into the Final Collision Chamber (FCC) 714, which consists of an expander 714a which is 2 inches in diameter at the entry, 3 inches at the exit, and 5 inches in length. Following the expander is a first reducer 714b which takes the diameter down from 3 inches to 2 inches and is 5 inches in length. A second reducer 714c reduces the diameter from 2 inches to 1 inch and is 3 inches in length. This is the configuration designed and placed in-line for the creation of a strong spinning counter-clockwise vortex discharge. In some embodiments, the flow is discharged in a vortex from the second reducer.

The discharged fluid is a flux, which comprises nano or micro gas bubbles entrained in the water (or other fluid). The discharge flow exists in a vortex.

For the purpose of understanding the Submersible System for Production of a Stabilized Gas Flux, references are made in the text to exemplary embodiments of a Submersible System for Production of a Stabilized Gas Flux, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Although the invention has been described with reference to the above examples, it will be understood that modifications and variations are encompassed within the spirit and scope of the invention. Accordingly, the invention is limited only by the following claims

The invention claimed is:

1. A diffusion system comprising:
   a) a water intake system operably connected to a submersible pump;
   b) an air intake system;
   c) a collision chamber operably connected to said water intake system and said air intake system;
   d) a nozzle;
   e) wherein said collision chamber comprises a first intake section connected to a first Y-section, said Y-section comprising two path sections, each said path sections connected at the other end to a first elbow, each of said first elbows being connected to a single, second Y-section in fluid communication with a plurality of 90-degree elbow fittings, said plurality of 90-degree elbow fittings being in fluid communication with a nozzle;
   f) wherein said nozzle comprises an expander and at least two reducers arranged sequentially in an adjacent manner along a flow path of the nozzle; and
   g) wherein said collision chamber comprises a plurality of piping configured so as to inject water from said water intake system with air from said air intake system so that a resulting stream is discharged from said nozzle comprising a stabilized flux.

2. The diffusion system of claim 1 wherein said water intake system comprises a filter system.

3. The diffusion system of claim 1 further comprising an auxiliary air induction system.

4. The diffusion system of claim 1 wherein said air intake system is in fluid communication with said pump so that said pump pulls air and water into the system as a single stream.

\* \* \* \* \*